UNITED STATES PATENT OFFICE.

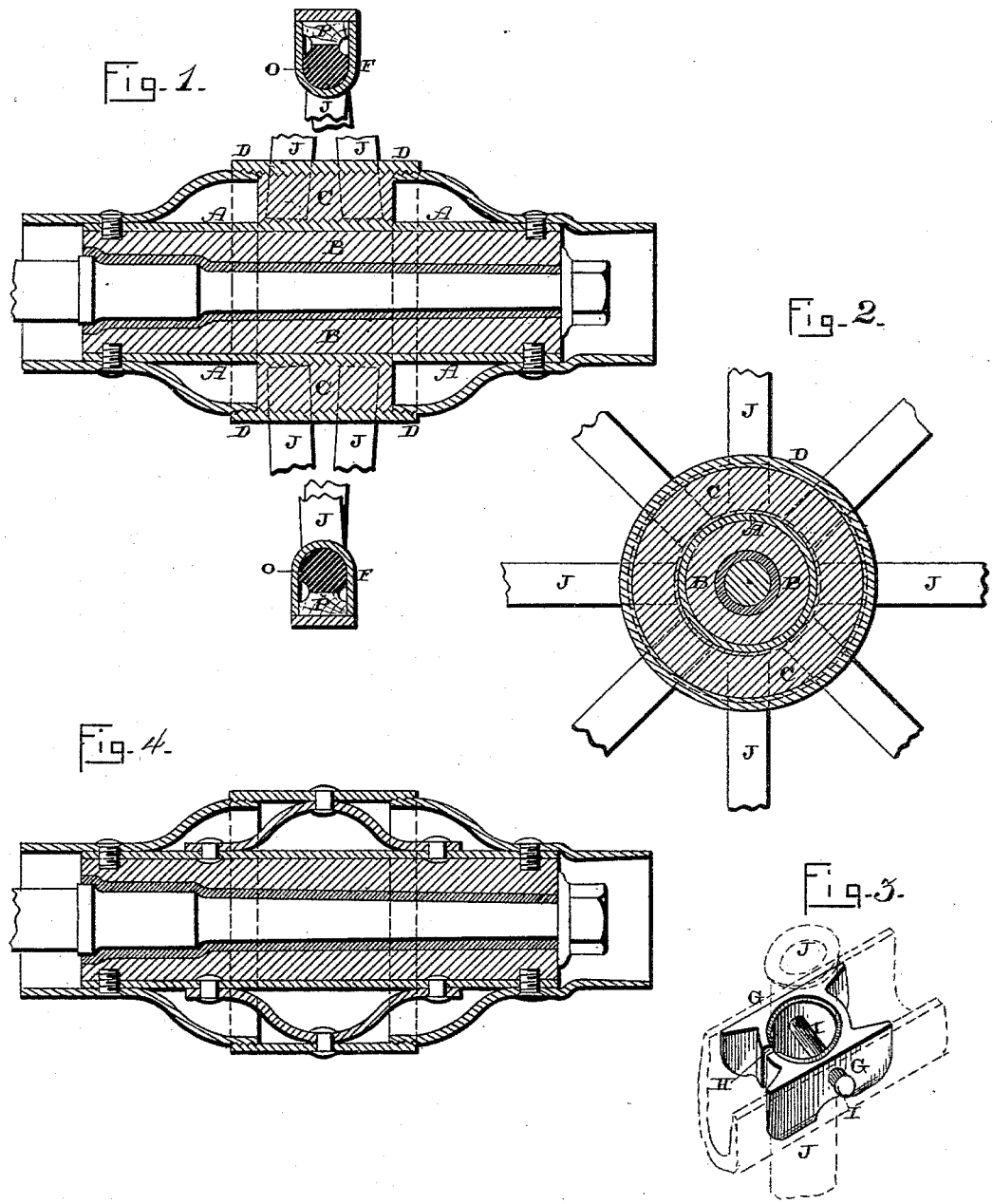

GEORGE HARKER EVERSON, OF PITTSBURG, PENNSYLVANIA.

METALLIC VEHICLE-WHEEL.

SPECIFICATION forming part of Letters Patent No. 425,311, dated April 8, 1890.

Application filed September 25, 1889. Serial No. 324,995. (No model.)

*To all whom it may concern:*

Be it known that I, GEORGE HARKER EVERSON, of Pittsburg, in the county of Allegheny and State of Pennsylvania, have invented certain new and useful Improvements in Metallic Vehicle-Wheels; and I do hereby declare the following to be a full, clear, and exact description of the invention, such as will enable others skilled in the art to which it pertains to make and use it, reference being had to the accompanying drawings, which form part of this specification.

My invention relates to an improvement in metallic vehicle-wheels; and it consists in the construction and arrangement of parts, as will be more fully described hereinafter.

The objects of my invention are to form the filling for the entire sleeve of the hub of papier-maché, so that it will not contract in dry countries where there is but little moisture; to place a solid band between the inner sleeve and the inner side of the outer ring, so as to brace and support the hub at this point, and to form deeper sockets to receive the inner ends of the spokes; to provide a solid fastening for the end of each spoke, and which is preferably split at one end, so that it can be contracted upon the end of the spoke, and should it by accident get loose at any time it can be reriveted, and to form a filling for a hollow metallic felly of rubber and wood, so as to strengthen the felly between the ends of the spokes, and to give to the felly a greater amount of elasticity than it would have if these materials were not used.

Figures 1 and 2 are vertical sections of a wheel which embodies my invention, taken at right angles to each other. Fig. 3 is a perspective of the fastening for the end of the spoke in the felly. Fig. 4 is a vertical section of a modification.

A represents the inner sleeve of the hub, which is provided with a filling B, of papier-maché, vulcanite fiber, or other equivalent substance which is forced into the sleeve under heavy pressure and through which a hole is bored to receive the box. Papier-maché, vulcanite fiber, or some similar substance which is not affected by the dryness or moisture of the atmosphere is used, so that this filling will not shrink in dry climates, as is the case with wood. While papier-maché or vulcanite fiber answer the purpose admirably, any other equivalent substance which will answer the same purpose may be used, and which is sufficiently tough to answer all the purposes of wood without any of its weakness.

In order to brace and strengthen the hub at its center and to form deeper sockets for the inner ends of the spokes, I place a solid band C around the outer side of the inner sleeve and which forms a solid support for the outer ring D. This band C may be made of metal, vulcanite fiber, papier-maché, or any other suitable material, and it may be screwed both upon the inner sleeve and into the outer ring D; or it may be riveted or secured in position in any other manner that may be preferred. The holes for the inner ends of the spokes will be bored through the outer ring D and the band C and the inner sleeve A; or it may be bored through the outer ring D and the band C alone, as may be preferred. This band adds great strength to the hub and enables a much stronger fastening to be made for the inner ends of the spokes.

Placed inside of the hollow felly F for each spoke is a fastening G, preferably of the shape shown, and which may be provided with a split H at one end, so that the fastening can be contracted upon the end of the spoke. The outer end of the opening through this fastening is countersunk, so as to receive the end of the spoke, which may be correspondingly shaped, so as to fit the countersunk portion, and thus take off all of the strain which would otherwise be brought to bear upon the rivet I, which holds the fastening G and the end of the spoke J in position inside of the felly. Should by any accident the fastening G ever become loose, the rivet I can be knocked out and then the fastening reriveted, thus causing the fastening to take a much stronger hold upon the end of the spoke than could be done if the fastening were not split at one end.

In order to make the felly F, which is made of any suitable light material, sufficiently strong and elastic between the fastenings for the ends of the spokes, a filling of rubber O, and of wood P is used. The pieces of rubber will be made to conform to the shape of the inner portion of the felly, and will be cut away longitudinally so as to allow it to expand, and upon the outer side of this rubber is placed a suitable thickness or thicknesses of wood, as shown. This wood and rubber fill the felly and brace and strengthen it between the fastenings for the spokes, and give to the wheel a greater amount of elasticity than it otherwise would have if a hollow felly alone were used. This filling may be made of rubber alone, if so desired; but I prefer to use both rubber and wood, leaving just enough space inside of the felly to allow the rubber to expand when the wheel strikes an obstruction of any kind or in going over rough ground.

The spokes are made of light metal of any suitable kind, and may either be made round or given the shape of the ordinary wooden buggy-spokes, as may be preferred.

Having thus described my invention, I claim—

1. The combination, with the spoke and felly, of a separate fastening for the outer end of the spoke placed in the felly, consisting of a single piece provided with outer bearing-surfaces for the felly, a central opening, a vertical slit in one of its ends, whereby the said clip may be expanded and contracted, and a rivet which passes through the felly, fastening, and spoke, substantially as shown.

2. The combination of the spoke, the felly, and a fastening G, having a countersink in its outer end and provided with a split H, substantially as shown.

3. The combination of the felly, the sections of rubber having their outer edges grooved longitudinally or cut away so as to allow them to expand, and the layers of wood placed outside of the rubber, substantially as described.

In testimony whereof I affix my signature in presence of two witnesses.

GEORGE HARKER EVERSON.

Witnesses:
   JAS. H. CANFIELD,
   J. A. BEATTY.